(12) United States Patent
Louwagie et al.

(10) Patent No.: US 7,454,975 B2
(45) Date of Patent: Nov. 25, 2008

(54) EXPANSION CHAMBER FOR USE WITH A PRESSURE TRANSMITTER

(75) Inventors: Bennett L. Louwagie, Plymouth, MN (US); Christopher L. Eriksen, St. Paul, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/697,399

(22) Filed: Apr. 6, 2007

(65) Prior Publication Data

US 2008/0245152 A1  Oct. 9, 2008

(51) Int. Cl.
*G01L 7/08* (2006.01)
(52) U.S. Cl. ............... 73/715; 73/716; 73/717
(58) Field of Classification Search ............ 73/700–756
See application file for complete search history.

(56) References Cited

U.S. PATENT DOCUMENTS

| | | | |
|---|---|---|---|
| 3,999,435 A | 12/1976 | Siegel | 73/393 |
| 4,329,877 A | 5/1982 | Hershey | 73/706 |
| 4,563,906 A | 1/1986 | Mathias | 73/862.58 |
| 5,731,522 A | 3/1998 | Sittler | 73/708 |
| 5,922,965 A | 7/1999 | Behm et al. | 73/706 |
| 6,032,538 A | 3/2000 | Rickman et al. | 73/756 |
| 6,038,961 A | 3/2000 | Filippi et al. | 92/98 |
| 6,568,274 B1 * | 5/2003 | Lucas et al. | 73/718 |
| 7,117,745 B2 | 10/2006 | Broden | 73/706 |
| 7,278,318 B2 * | 10/2007 | Dannhauer et al. | 73/716 |

FOREIGN PATENT DOCUMENTS

EP  1 400 797 A1  9/2003

* cited by examiner

*Primary Examiner*—Edward Lefkowitz
*Assistant Examiner*—Jermaine Jenkins
(74) *Attorney, Agent, or Firm*—Westman, Champlin & Kelly, P.A.

(57) ABSTRACT

A pressure monitoring system provides a pressure sensor and a body that has a first coefficient of thermal expansion and includes at least one opening for accessing a process fluid. At least one isolation diaphragm is coupled to the body and positioned in the at least one opening. The at least one isolation diaphragm has a first surface in communication with the process fluid. At least one passageway is located in the body and configured to contain a fill fluid in communication with a second surface of the first isolation diaphragm. The at least one passageway is positioned between the first isolation diaphragm and the pressure sensor. At least one expansion chamber is coupled to the first passageway and includes an insert having a second coefficient of thermal expansion. The first coefficient of thermal expansion of the body is greater than the second coefficient of thermal expansion of the insert.

21 Claims, 7 Drawing Sheets

EXPANSION CHAMBER FOR USE WITH A PRESSURE TRANSMITTER

BACKGROUND

The present invention relates to pressure transmitters. More specifically, the invention relates to pressure transmitters utilizing an isolating diaphragm and fill fluid to transmit a process pressure to a pressure sensor.

A process transmitter generally includes a transducer or sensor that responds to a process variable. A process variable generally refers to a physical or chemical state of matter or conversion of energy. Examples of process variables include pressure, temperature, flow, conductivity, pH and other properties. Pressure is considered to be a basic process variable in that it can be used to measure flow, level and even temperature.

Pressure transmitters are commonly used in industrial processes to measure and monitor pressures of various industrial process fluids, such as slurries, liquids, vapors and gases of chemicals, pulp, petroleum, gas, pharmaceuticals, food and other fluid-type processing plants. Often times pressure transmitters are subject to certain industrial applications that are harsh and of varying environmental conditions. For example, a pressure transmitter can undergo extreme temperature changes.

Transmitters that can sense pressure typically include a pressure sensor coupled to at least one isolation diaphragm. The isolation diaphragm is positioned in an opening of the transmitter and isolates the pressure sensor from the harsh process fluids being sensed. Pressure is transferred from the process fluid to the pressure sensor through a substantially incompressible fill fluid carried in a passageway extending from the isolation diaphragm to the pressure sensor.

Some pressure transmitters are components of remote seal systems. In a remote seal system, an isolation diaphragm is remotely located from the pressure transmitter because of the corrosive nature or temperature of the industrial process fluid being sensed. The remotely located isolation diaphragm is fluidically coupled to the pressure sensor by a fill fluid that fills a capillary tube and cavities of a remote seal body which houses the remotely located isolation diaphragm. The fill fluid conveys the exerted pressure of the process fluid through the capillary tube to the pressure sensor in the pressure transmitter.

The fill fluid used in either of the above-described pressure sensing systems expands when exposed to high temperatures. An expanded fill fluid occupies a larger volume in the cavities of the pressure transmitter and/or the capillary tube and cavities of the remote seal housing than that of a non-expanded fill fluid. A large volume of fill fluid affects the ability of the pressure sensor to accurately sense pressure of the process fluid as well as the ability of the isolation diaphragm to properly isolate the process fluid from the fill fluid. Many times the expansion of the fill fluid can ultimately degrade the systems in which pressure transmitters are utilized. One technique to address this is shown in U.S. Pat. No. 5,731,522 entitled "TRANSMITTER WITH ISOLATION ASSEMBLY FOR PRESSURE SENSOR" to Rosemount, Inc. of Eden Prairie, Minn., which is commonly assigned with the present application.

SUMMARY

Embodiments of the disclosure are directed to a pressure monitoring system that includes a pressure sensor and a body that has a first coefficient of thermal expansion and includes at least one opening for accessing a process fluid. At least one isolation diaphragm is coupled to the body and positioned in the at least one opening. The at least one isolation diaphragm has a first surface in communication with the process fluid. At least one passageway is located in the body and configured to contain a fill fluid in communication with a second surface of the first isolation diaphragm. The at least one passageway is positioned between the first isolation diaphragm and the pressure sensor. At least one expansion chamber is coupled to the first passageway and includes an insert having a second coefficient of thermal expansion. The first coefficient of thermal expansion of the body is greater than the second coefficient of thermal expansion of the insert. In one embodiment, the pressure monitoring system is a pressure transmitter for coupling to a process fluid. In another embodiment, the pressure monitoring system includes a remote seal system.

DETAILED DESCRIPTION

Figure 1:
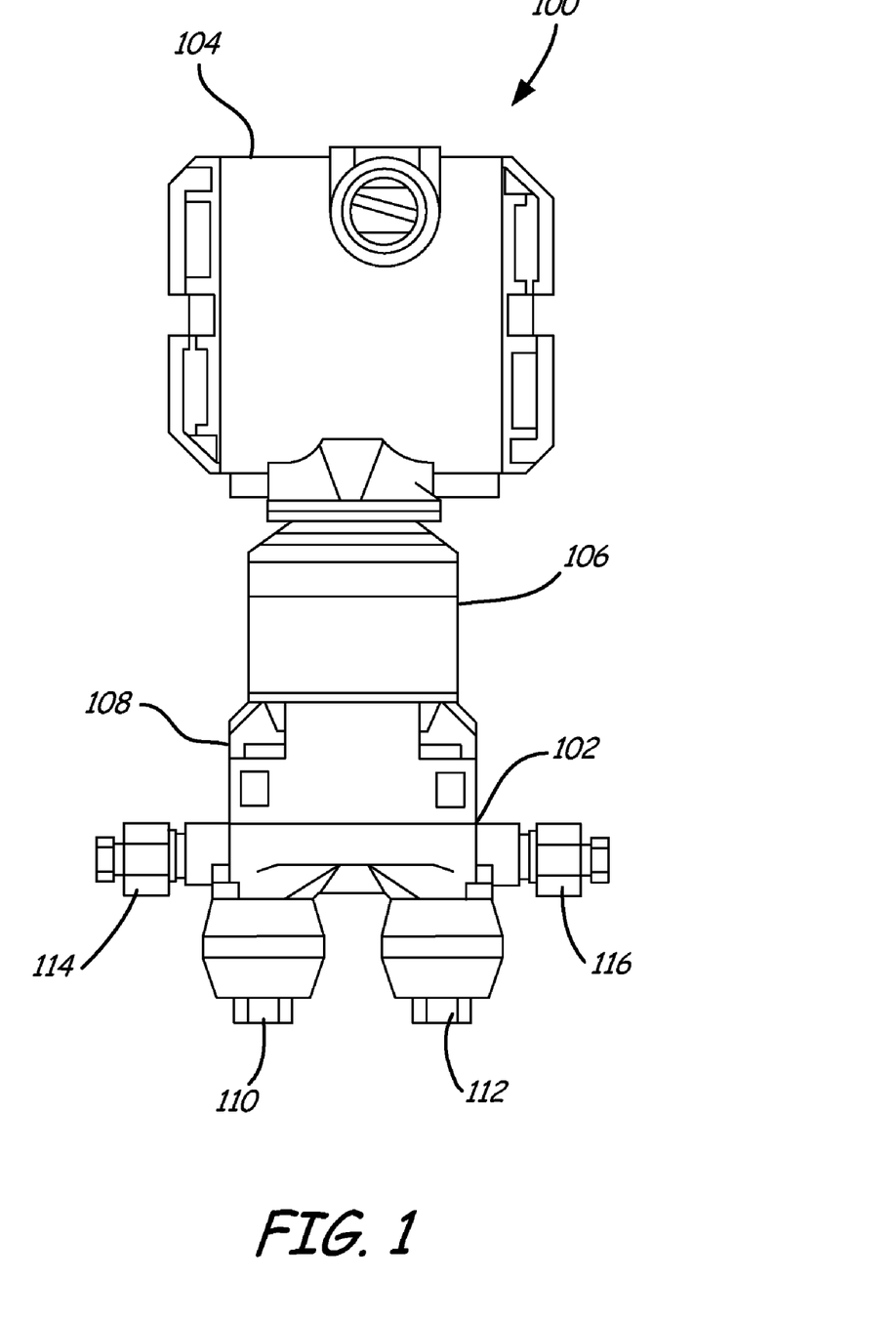
FIG. 1 is a diagrammatic view of an exemplary pressure transmitter coupled to a flange.

FIG. 1 illustrates an exemplary pressure transmitter 100 of which disclosed embodiments are useful and pressure can be monitored and measured. Pressure transmitter 100 generally includes a transmitter body 104 coupled to a sensor body 106, where sensor body 106 is further coupled to an isolator assembly 108 that is finally coupled to a flange or manifold 102. Alternatively, the transmitter body 104 and sensor body 106 can be formed as an integral instrument. In FIG. 1, flange 102 is a CoPlanar™ type product. CoPlanar™ type products includes flange 102 that taps into the process fluid for access versus the flange being in-line with the process fluid. Such flanges are available from Rosemount, Inc. of Chanhassen, Minn. under the trade designation Model 305 and 306 manifolds. However, embodiments of the disclosure can be used with other types of flanges or manifolds that use other types of couplings to receive process fluid.

Flange 102 includes a pair of process fluid inlets 110 and 112 and a pair of vent assemblies 114 and 116. Process fluid inlets 110 and 112 allow pressure transmitter 100 to measure differential (or gage) pressure of the process fluid. Although FIG. 1 illustrates two fluid inlets 110 and 112, embodiments of the disclosure can be used with any number of inlets. For example, embodiments of the disclosure can include a single inlet such that a pressure transmitter measures gage and absolute pressure.

Figure 2:
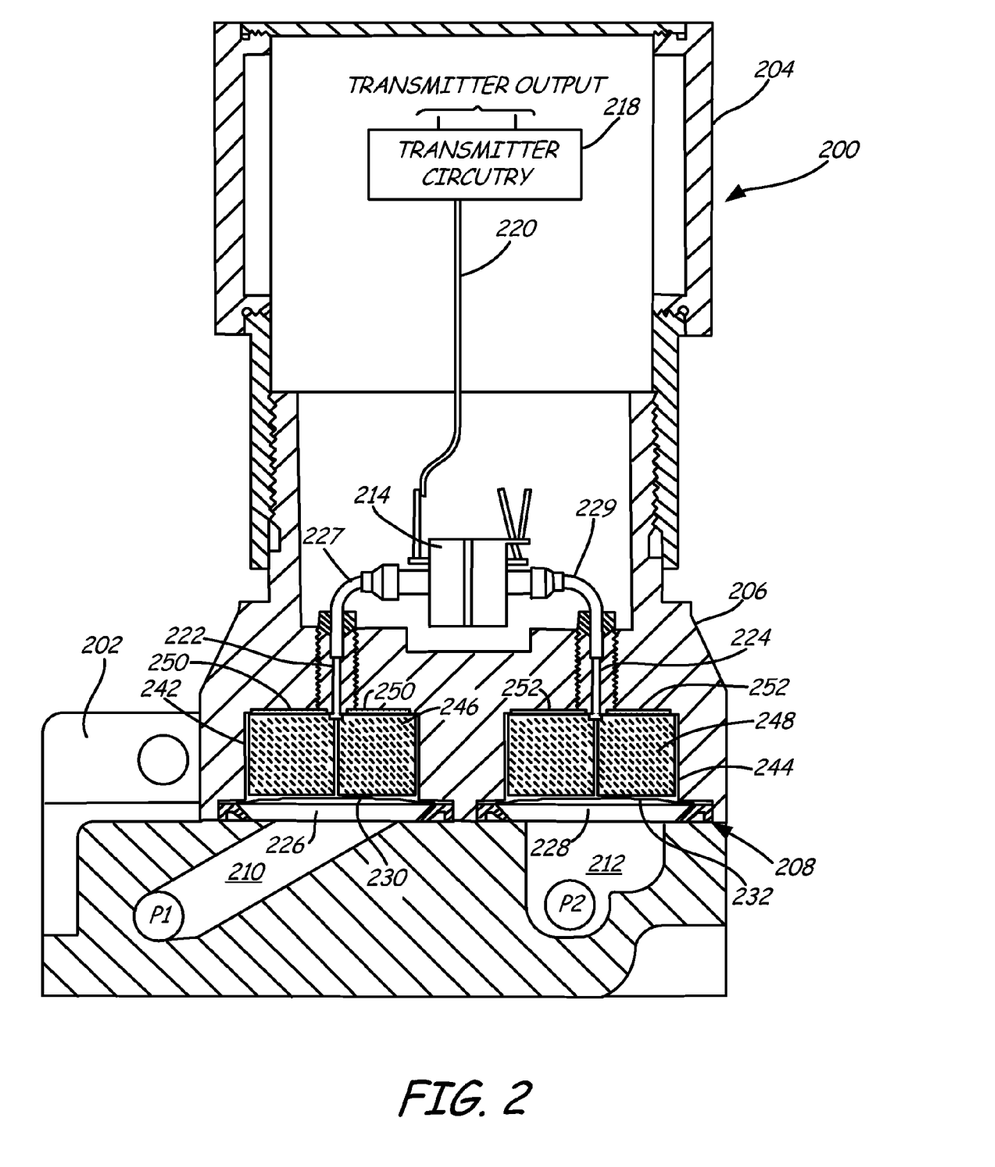
FIG. 2 is a sectional view of one embodiment of a pressure transmitter having a low expansion insert.

In one embodiment, FIG. 2 illustrates a sectional view of a pressure transmitter 200 coupled to a flange or manifold 202. Pressure transmitter 200 includes a transmitter body 204 and a sensor body 206. Typically, transmitter body 204 and sensor body 206 are made of the same material. Typically, this material is a low carbon stainless steel, such as grade 316L. The material of transmitter body 204 and sensor body 206 includes a coefficient of thermal expansion that is relatively high compared to other types of steels and metals. Sensor body 206 is configured to house a pressure sensor 214 and an isolator assembly 208. Transmitter body 204 is configured to house transmitter circuitry 218. Sensor 214 is coupled to transmitter circuitry 218 through communication bus 220. Transmitter circuitry 218 sends information related to the pressure of the process fluid over a communication link such as the transmitter output illustrated in FIG. 2. For example, transmitter circuitry 218 can send information related to pressure of a process fluid over a two wire communication circuit, such as a 4-20 mA current loop or process control industry standard HART® or Fieldbus loop. Pressure transmitter 200 can be powered by a controller. Alternatively, the transmitter can use a wireless network.

In one embodiment, pressure sensor 214 measures a difference in pressure between pressure P1 in a first inlet 210 of flange 202 and pressure P2 in a second inlet 212 of flange 202. Pressure P1 is coupled to pressure sensor 214 through a first passageway 222. Pressure P2 is coupled to pressure sensor 214 through a second passageway 224. First passageway 222 extends from a first opening 226 in pressure transmitter 200 to pressure sensor 214 and through first sensor mounting tube 227. Second passageway 224 extends from a second opening 228 in pressure transmitter 200 to pressure sensor 214 and through second sensor mounting tube 229. Passageways 222 and 224 are filled with a relatively incompressible fill fluid, such as oil, silicone, glycerin and water, propylene glycol and water or any other suitable fluid.

Isolator assembly 208 includes a first isolation diaphragm 230 positioned in first opening 226 and coupled to sensor body 206. Isolator assembly 208 also includes a second isolation diaphragm 232 positioned in second opening 228 and coupled to sensor body 206. First isolation diaphragm 230 is in communication with the fill fluid in first passageway 222 while simultaneously in communication with the process fluid in inlet 210. Second isolation diaphragm 232 is in communication with the fill fluid in second passageway 224 while simultaneously in communication with the process fluid in inlet 212. Isolation diaphragms 230 and 232 transfer properties and characteristics of the process fluid at inlets 210 and 212 to the fill fluid in passageways 222 and 224. Pressure sensor 214 senses properties and characteristics of the process fluid contained in passageways 222 and 224. When pressure transmitter 200 is exposed to a process fluid and/or ambient temperature that has varying environmental conditions, such as extreme temperature fluctuations, the fill fluid expands as temperature increases. To prevent damage to components of pressure transmitter 200, such as isolation diaphragms 230 and 232, and to sustain performance of pressure transmitter 200, in one embodiment, first passageway 222 is coupled to a first expansion chamber 242 and second passageway 224 is coupled to a second expansion chamber 244.

First and second expansion chambers 242 and 244 are formed in sensor body 206. In one embodiment, expansion chambers 242 and 244 are integrally formed with sensor body 206. In another embodiment, expansion chambers 242 and 244 are separate shells that are inserted into sensor body 206. Expansion chambers 242 and 244 are interposed along passageways 222 and 224, respectively, between openings 226 and 228 and pressure sensor 214. First expansion chamber 242 includes a first insert 246 and second expansion chamber 244 includes a second insert 248. Each insert 246 and 248 is coupled to corresponding expansion chambers 242 and 244 by welding. For example, each insert 246 and 248 is coupled to each expansion chamber 242 and 244 by a pair of weld rings 250 and 252.

Figure 3:
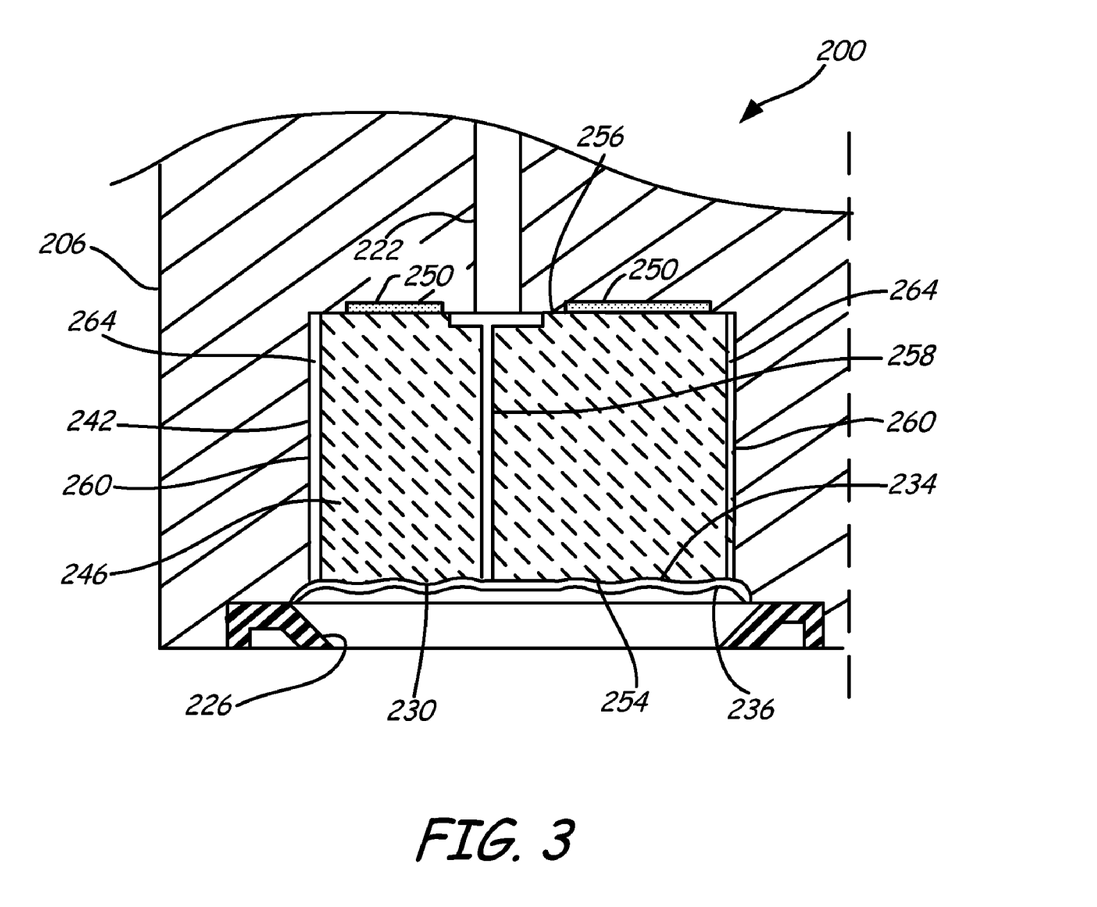
FIG. 3 is an enlarged partial sectional view of the embodiment illustrated in FIG. 2.

FIG. 3 illustrates an enlarged sectional view of first expansion chamber 242 interposed along first passageway 222 of pressure transmitter 200 and first isolation diaphragm 230 positioned in first opening 226. It should be noted that all details discussed in regards to FIG. 3 also apply to second expansion chamber 244 interposed along second passageway 224 of pressure transmitter 200. Components of first passageway 222 and components coupled to first passageway 222 are substantially mirror images of components of second passageway 224 and components coupled to second passageway 224.

First isolation diaphragm 230 includes a first surface 234 and a second surface 236. First isolation diaphragm 230 is in communication with fill fluid 254 in first passageway 222 on first surface 234 and in communication with the process fluid on second surface 236. First expansion chamber 242 is defined by a first surface 260, a second surface 256 that couples to first surface 260 and first opening 226. As previously discussed, expansion chamber 242 includes first insert 246. First insert 246 is coupled to second surface 256 of expansion chamber 242 by the pair of weld rings 250 and 252 such that first insert 246 is suspended in expansion chamber 242. First insert 246 has a coefficient of thermal expansion that is less than the coefficient of thermal expansion of sensor body 206. Example materials for first insert 246 (and second insert 248) include low thermal expansion non-outgassing materials, such as ceramic, glass, borosilicate glass or metals including Kovar (nickel and cobalt alloy) and Invar (an iron and nickel alloy known for its controlled coefficient of thermal expansion). These materials are well suited for Coplanar™ type products where electrical insulating materials are not needed. However, a ceramic material can be used for other types of products where electrical insulating materials are needed.

In one embodiment, first insert 246 includes a central passageway 258 and is separated from first surface 260 by a gap 264. Central passageway 258 extends through first insert 246 from first opening 226 to second surface 256. Upon exposure of pressure transmitter 200 to a process fluid having an extreme temperature, or extreme ambient temperature, sensor body 206 will expand volumetrically more than insert 246 based on their respective material coefficients of thermal expansion. Such differences in volumetric expansion means that gap 264 will increase in volume such that an expanding fill fluid 254 is allowed to fill gap 264 and fill central passageway 258 instead of expanding under the isolation diaphragm 230 and causing a change of performance of pressure transmitter 200. In general, first insert 246 needs to have a volume that is 20 to 30 times larger than a volume of fill fluid 254 in first passageway 222. This reduces the effect of temperature variations on the pressure sensor system to provide more accurate measurements.

Figure 4:
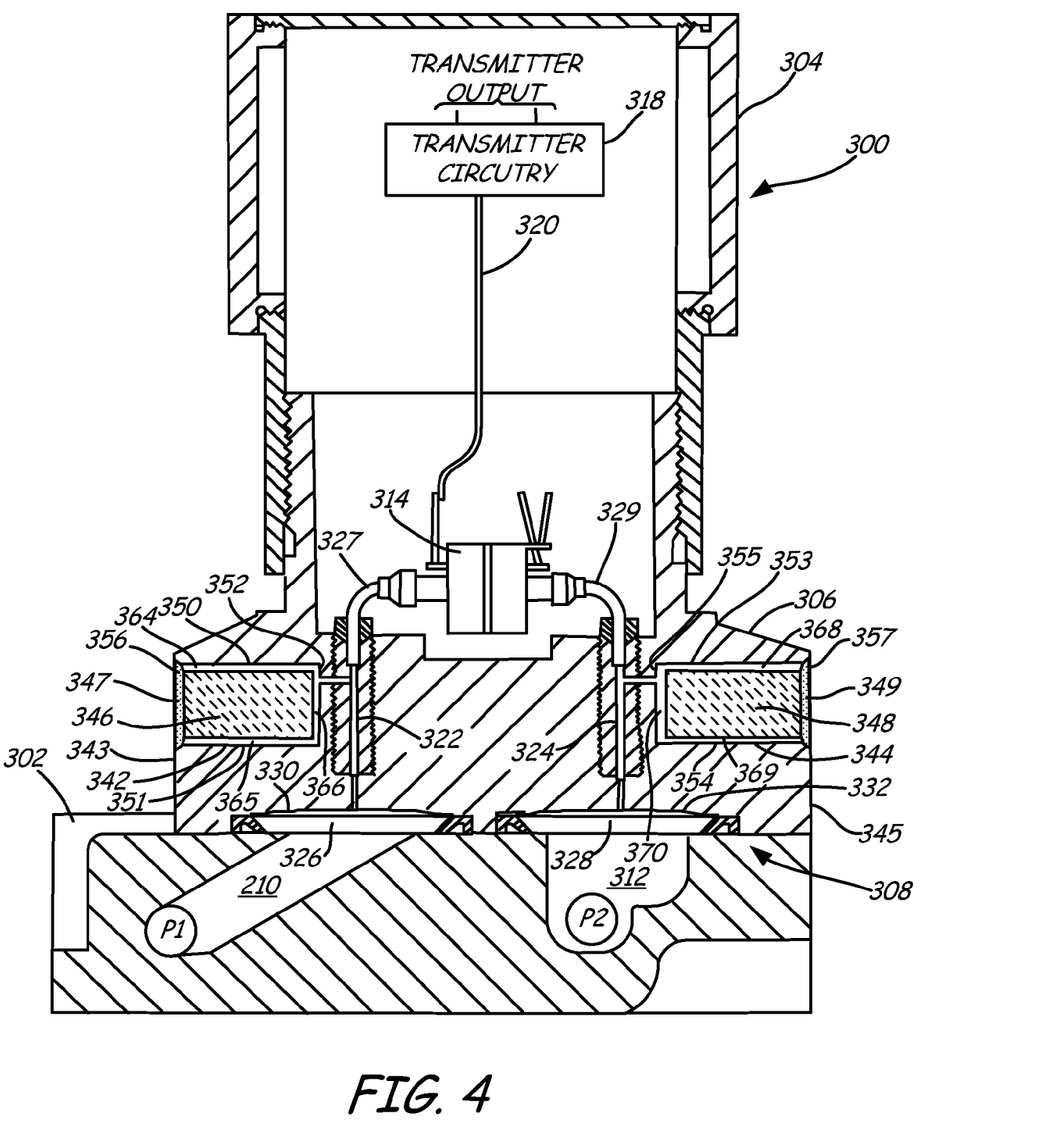
FIG. 4 is a sectional view of one embodiment of a pressure transmitter having a low expansion insert.

In another embodiment, FIG. 4 illustrates a sectional view of a pressure transmitter 300 coupled to a flange or manifold 302. Like pressure transmitter 200 of FIGS. 2 and 3, pressure transmitter 300 includes a transmitter body 304 and a sensor body 306, which are typically made of a low carbon stainless steel, such as grade 316L, having a coefficient of thermal expansion that is relatively high compared to other types of steels and metals. Sensor body 306 is configured to house a pressure sensor 314 and an isolator assembly 308. Transmitter body 304 is configured to house transmitter circuitry 318. Sensor 314 is coupled to transmitter circuitry 318 through communication bus 320. Transmitter circuitry 318 sends information related to pressure of the process fluid over a communication link such as the transmitter output illustrated in FIG. 3. Pressure transmitter 300 can be powered by a controller. Alternatively, the transmitter can use a wireless network.

In one embodiment, pressure sensor 314 measures a difference in pressure between pressure P1 in a first inlet 310 of flange 302 and pressure P2 in a second inlet 312 of flange 302. Pressure P1 is coupled to pressure sensor 314 through a first passageway 322. Pressure P2 is coupled to pressure sensor 314 through a second passageway 324. First passageway 322 extends from a first opening 326 in pressure transmitter 300 to pressure sensor 314 and through first sensor mounting tube 327. Second passageway 324 extends from a second opening 328 in pressure transmitter 300 to pressure sensor 314 and through second sensor mounting tube 329. Passageways 322 and 324 are filled with a fill fluid like that in pressure transmitter 200 (FIG. 2).

Isolator assembly 308 includes a first isolation diaphragm 330 positioned in first opening 326 and coupled to sensor body 306. Isolator assembly 308 includes a second isolation diaphragm 332 positioned in second opening 328 and coupled to sensor body 306. Like pressure transmitter 200 of FIGS. 2 and 3, first isolation diaphragm 330 is in communication with the fill fluid in first passageway 322 and in communication with the process fluid in inlet 310. Second isolation diaphragm 332 is in communication with the fill fluid in second passageway 324 and in communication with the process fluid in inlet 312. Isolation diaphragms 330 and 332 transfer properties and characteristics of the process fluid at inlets 310 and 312 to the fill fluid in passageways 322 and 324. Pressure sensor 314 senses properties and characteristics of the process fluid contained in passageways 322 and 324. When pressure transmitter 300 is exposed to a process fluid that has varying environmental conditions, such as extreme temperature increases, the fill fluid expands as the temperature increases. To prevent damage to components of pressure transmitter 300, such as isolation diaphragms 330 and 332, and to sustain performance of pressure transmitter 300, in one embodiment, first passageway 322 is coupled to a first expansion chamber 342 and second passageway 324 is coupled to a second expansion chamber 344.

Expansion chambers 342 and 344 are formed in sensor body 306. In one embodiment, expansion chambers 342 and 344 are integrally formed with sensor body 306. In the embodiment illustrated in FIG. 3, first expansion chamber 342 is interposed between an opening 347 on a first side 343 of sensor body 306 and first passageway 322. First expansion chamber 342 is defined by first and second opposing surfaces 350 and 351, a third surface 352 and opening 347. Alternatively, expansion chamber 342 could be cylindrical and be defined by a two surfaces instead of three. Second expansion chamber 344 is interposed between an opening 349 on a second side 345 of sensor body 306 and second passageway 324. Second expansion chamber 344 is defined by first and second opposing surfaces 353 and 354, a third surface 355 and opening 349. Alternatively, expansion chamber 344 could be cylindrical and be defined by two surfaces instead of three.

First expansion chamber 342 is fluidically coupled to first passageway 322 at third surface 352. Second expansion chamber 344 is fluidically coupled to second passageway 324 at third surface 355. First expansion chamber 342 includes a first insert 346 and second expansion chamber 344 includes a second insert 348. First insert 346 is coupled to sensor body 306 and is suspended in first expansion chamber 342. Second insert 346 is coupled to sensor body 306 and is suspended in second expansion chamber 344. Both inserts 346 and 348 are coupled to sensor body 306 by welding.

Figure 5:
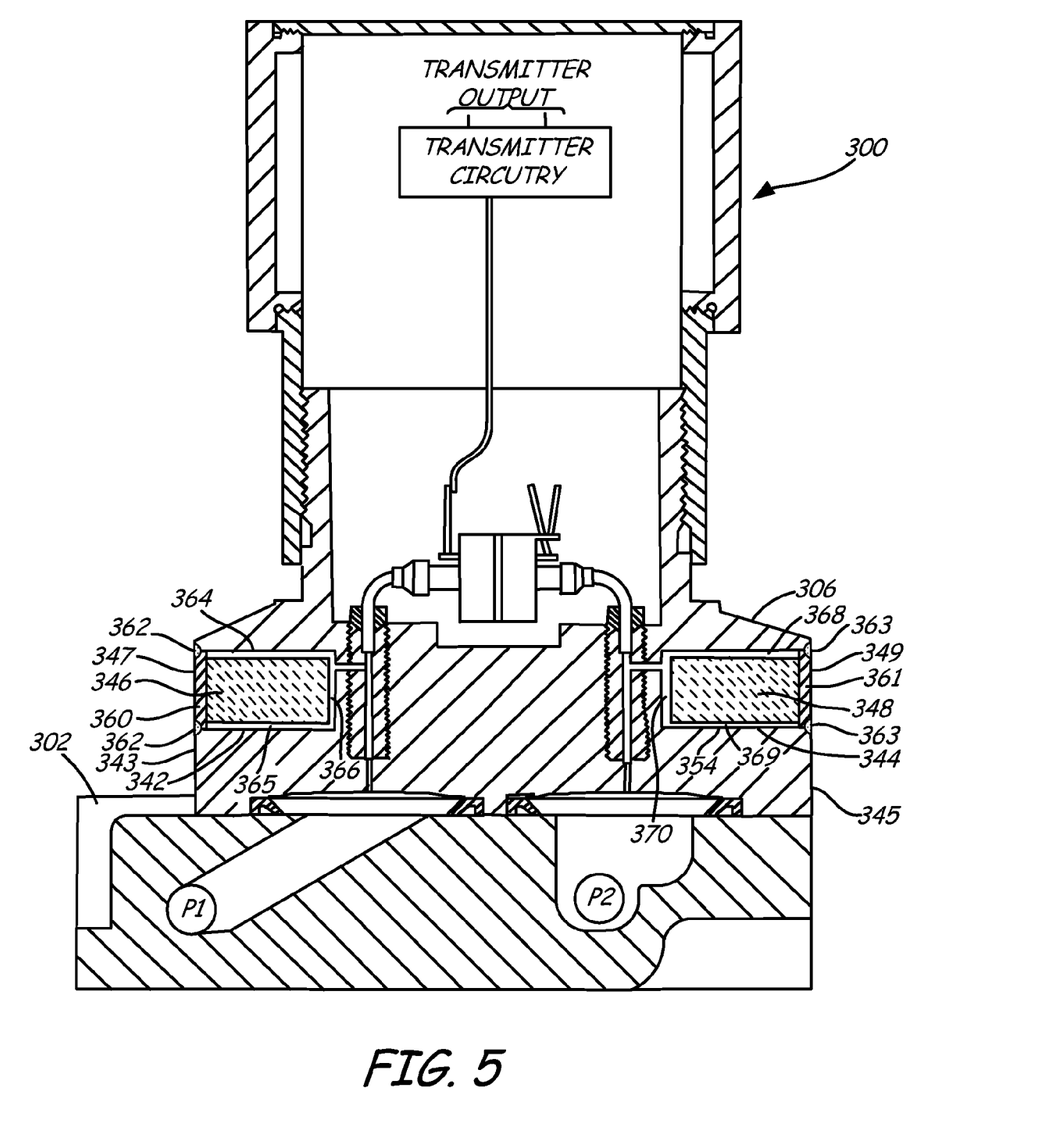
FIG. 5 is a sectional view of one embodiment of a pressure transmitter having a low expansion insert.

In one embodiment and as illustrated in FIG. 4, each insert 346 and 348 is welded to sensor body 306 by respective weld rings 356 and 357. Each weld ring 356 and 357 extends across opening 347 on first side 343 and opening 349 on second side 345. Therefore, inserts 346 and 348 are suspended in their corresponding expansion chambers 342 and 344 from openings 347 and 349 on sides 343 and 345 of sensor body 306. In another embodiment and as illustrated in FIG. 5, each insert 346 and 348 of expansion chambers 342 and 344 are welded to sensor body 306 via respective caps 360 and 361. Caps 360 and 361 are made of the same material as sensor body 306, such as stainless steel 316L, and inserted into each expansion chamber 342 and 344 between each insert 346 and 348 and each opening 347 and 349. Each cap 360 and 361 is then welded to each side 343 and 345 of sensor body 306 with a pair of weld rings 362 and 363, respectively.

Each insert 346 and 348 illustrated in both FIGS. 4 and 5 has a coefficient of thermal expansion that is less than the coefficient of thermal expansion of sensor body 306. Like inserts 246 and 248 of FIGS. 2 and 3, example materials for inserts 346 and 348 include low thermal expansion non-outgassing materials, such as ceramic, glass, borosilicate glass or metals including Kovar and Invar. Insert 346 is separated from first and second opposing surfaces 350 and 351 by a pair of gaps 364 and 365 and is separated from third surface 352 by a gap 366. Insert 348 is separated from first and second opposing sides 353 and 354 by a pair of gaps 368 and 369 and is separated from third surface 355 by a gap 370.

With reference to both FIGS. 4 and 5, upon exposure of pressure transmitter 300 to an extreme temperature of the process fluid, or extreme ambient temperature sensor body 306 and therefore expansion chambers 342 and 344 will expand volumetrically more than inserts 346 and 348 based on their respective material coefficients of thermal expansion. Such differences in volumetric expansion means that gaps 364, 365 and 366 between first insert 346 and first expansion chamber 342 will grow. The expanding fill fluid will fill gaps 364, 365 and 366 from first passageway 322 instead of expanding under the isolation diaphragm 330 and causing a change of performance of pressure transmitter 300. In addition, such differences in volumetric expansion means that gaps 368, 369 and 370 between second insert 348 and second expansion chamber 344 will grow. The expanded fill fluid is allowed to fill gaps 368, 369 and 370 from second passageway 324 instead of expanding under isolation diaphragm 332 and causing a change in performance of pressure transmitter 300. In general, for the fill fluid to expand into gaps 364, 365 and 366 and gaps 368, 369 and 370, inserts 346 and 348 need to have a volume that is 20 to 30 times larger than a volume of fill fluid 254 that is in process transmitter 200.

Figure 6:
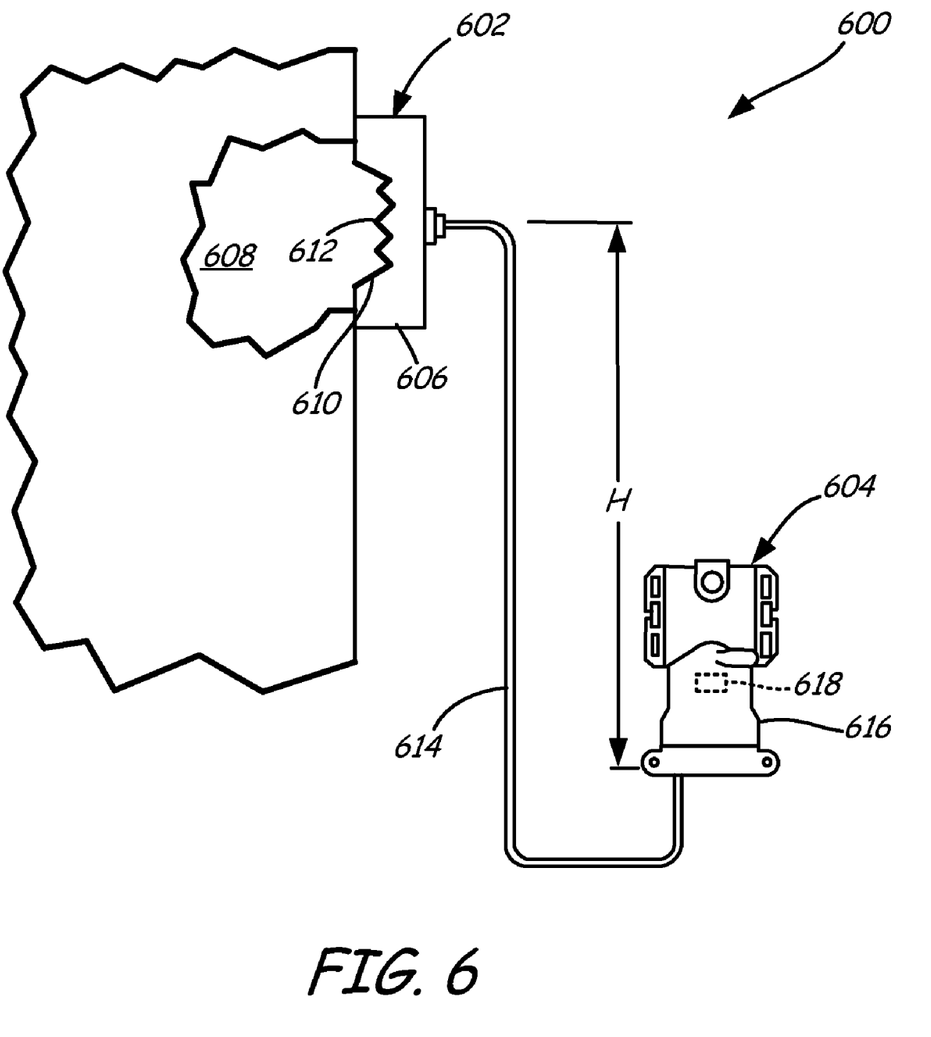
FIG. 6 is a diagrammatic view of a remote seal system.

FIG. 6 illustrates a remote seal system 600 of a yet another embodiment of the disclosure. Remote seal system 600 is capable of monitoring and measuring pressure. In FIG. 6, a flanged flush-diaphragm mount remote seal 602 can be used with a pressure transmitter 604. Remote seal 602 includes a remote seal body 606, which is protected from contact with process fluid 608. Instead of sensing pressure as in the embodiments illustrated in FIGS. 2-5, remote seal 602 can be used in instances to protect the electronics and the sensors in pressure transmitter 604 from extremely hot, cold or corrosive process media 608. Remote seal 602 can also be used to allow pressure transmitter 604 to be mounted remotely from the measurement point while keeping the process contained at the process connection. Additionally, remote seal 602 can be used to sense pressures in viscous processes that would otherwise clog an instrument or process.

Remote seal 602 includes an opening 610 wherein an isolation diaphragm 612 is positioned. Isolation diaphragm 612 contacts process medium 608, and therefore is generally fabricated out of a material which can resist corrosion from process fluid 608. Remote seal system 600 includes a capillary tube 614 which couples the remote seal isolation diaphragm 612 to pressure transmitter 604. Capillary tube 614 includes a remote seal fill fluid, such as oil, silicone, glycerin and water, propylene glycol and water or any other suitable fluid. Capillary tube 614 couples the remote seal isolation diaphragm 612 to pressure transmitter 604.

Pressure transmitter 604 includes a sensor body 616 that houses a pressure sensor 618. Pressure transmitter 604 can include its own isolation diaphragm(s), like the pressure transmitters illustrated in FIGS. 2-5, and can rely on its own fill fluid located between its own isolation diaphragm(s) and pressure sensor 616. However, pressure transmitter 604 can also not include its own isolation diaphragm and instead rely on the fill fluid included in capillary tube 614 to contact pressure sensor 616. When process pressure is applied from process medium 608, remote seal isolation diaphragm 612 displaces fill fluid that runs between remote seal isolation diaphragm 612 and pressure transmitter 604 through capillary tube 614. The displaced fluid thereby transmits the pressure applied by process medium 608 to pressure sensor 618.

When remote seal 602 is exposed to a process fluid that has varying environmental conditions, such as extreme temperature increases, the fill fluid that runs between remote seal isolation diaphragm 612 and pressure transmitter 604 through capillary tube 614 expands. To prevent damage to components of remote seal 602 and to sustain performance of remote seal 602, in one embodiment, an expansion chamber is located in remote seal body 606.

Figure 7:
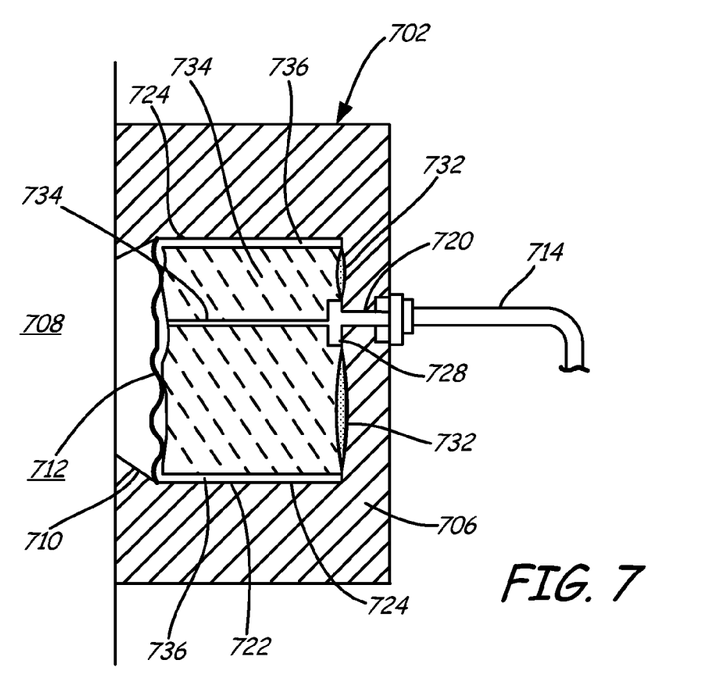
FIG. 7 is an enlarged sectional view of one embodiment of a remote seal having a low expansion insert.

FIG. 7 illustrates a sectional view of one embodiment of remote seal 702. Remote seal 702 includes a remote seal body 706, which is protected from contact with process fluid 708 by an isolation diaphragm 712. Remote seal body 706 includes an opening 710 wherein isolation diaphragm 712 is positioned. Housing 706 also includes a passageway 720 located between capillary tube 714 and isolation diaphragm 712. Passageway 720 and capillary tube 714 are filled with a fill fluid.

Typically, remote seal body 706 is made of stainless steel, which generally has a relatively higher coefficient of thermal expansion than that of other types of steels and metals. Isolation diaphragm 712 is in communication with fill fluid in capillary tube 714 and passageway 720 and in communication with process fluid 708 at opening 710. Isolation diaphragm 712 transfers properties and characteristics of process fluid 708 to the fill fluid in passageway 720 and capillary tube 714. The fill fluid contained in passageway 720 and capillary tube 714 is directed towards a pressure transmitter, such as pressure transmitter 604 of FIG. 6, such that pressure of the fill fluid having properties and characteristics of the process fluid 708 can be sensed by a pressure sensor, such as pressure sensor 618 of FIG. 6. As previously discussed, the fill fluid in passageway 720 and capillary tube 714 can be put into direct contact with the pressure sensor of the pressure transmitter or can be in communication with an isolator assembly in the pressure transmitter, such that a fill fluid in the pressure transmitter is directed towards the pressure sensor.

To prevent damage to components of remote seal 702, such as isolation diaphragm 712, and to sustain performance of remote seal 702, an expansion chamber 722 is included in remote seal 702. In one embodiment, expansion chamber 722 is integrally formed with remote seal body 706 and is interposed along passageway 720 between opening 710 and capillary tube 714. Expansion chamber 722 is defined by first surface 724, a second surface 728 which couples the first surface 724 and opening 710. Expansion chamber 722 includes an insert 730. Insert 730 is coupled to second surface 728 of housing 706 by welding. For example, insert 730 is coupled to second surface 728 and suspended in remote seal body 706 by a pair of weld rings 732.

Insert 730 has a coefficient of thermal expansion that is less than the coefficient of thermal expansion of remote seal body 706. Example materials for insert 730 include low thermal expansion non-outgassing materials, such as ceramic, glass, borosilicate glass or metals including Kovar and Invar. Insert 730 includes a central passageway 734 and is separated from first surface 724 of expansion chamber 722 by a gap 736. Central passageway 734 extends through insert 730 from opening 710 to second surface 728. Upon exposure of remote seal 702 to an extreme temperature of process fluid 708, remote seal body 706 and therefore expansion chamber 722 will expand volumetrically more than insert 734 based on their respective material coefficients of thermal expansion. Such differences in volumetric expansion means gap 736 will increase in volume such that an expanded fill fluid is allowed to fill gap 736 instead of expanding under the isolation diaphragm 712.

Figure 8:
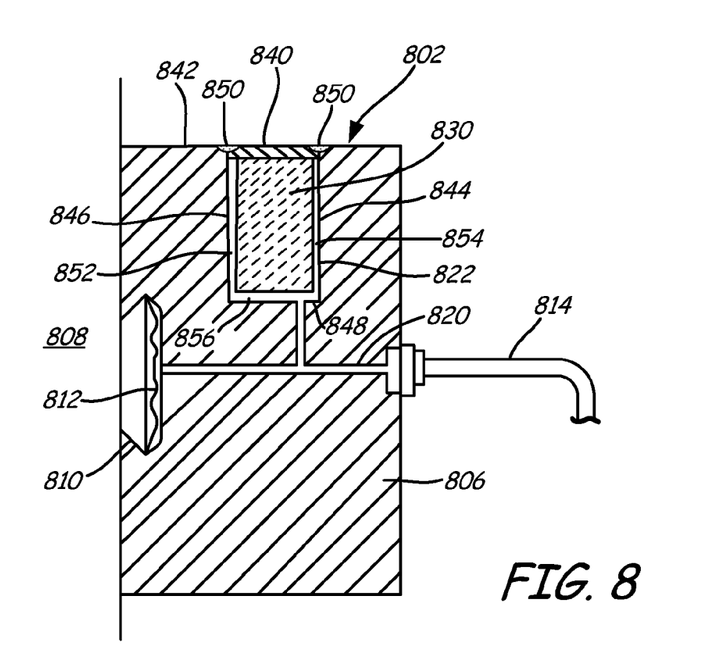
FIG. 8 is an enlarged sectional view of one embodiment of a remote seal having a low expansion insert.

In another embodiment, FIG. 8 illustrates a sectional view of a remote seal 802. Like remote seal 702 of FIG. 7, remote seal 802 includes a remote seal body 806, which is typically made of a stainless steel and has a coefficient of thermal expansion that is relatively high compared to other types of steels and metals. Remote seal body 806 includes an opening 810 wherein an isolation diaphragm 812 is positioned. Remote seal body 806 also includes a passageway 820 located between capillary tube 814 and isolation diaphragm 812. Passageway 820 and capillary tube 814 are filled with fill fluid.

Typically, remote seal body 806 is made of stainless steel, which generally has a relatively higher coefficient of thermal expansion than that of other types of steels and metals. In operation, remote seal 802 is like remote seal 702 in that isolation diaphragm 812 is in communication with the fill fluid in capillary tube 814 and passageway 820 and in communication with process fluid 808 at opening 810.

To prevent damage to components of remote seal 802, such as isolation diaphragm 812, and to sustain performance of remote seal 802, an expansion chamber 822 is formed in remote seal 702. In one embodiment, expansion chamber 822 is integrally formed with remote seal body 806 of remote seal 802. In particular, expansion chamber 822 is interposed between a side opening 840 on first side 842 of remote seal body 806 towards passageway 820. Expansion chamber 822 is defined by first and second opposing surfaces 844 and 846, a third surface 848 which couples the first and second side surfaces 844 and 846 and side opening 840. Expansion chamber 822 is fluidically coupled to passageway 820 at third surface 848. Expansion chamber 822 includes an insert 830. Insert 830 is coupled to and suspended in expansion chamber 822 by welding.

In one embodiment, although not illustrated in FIG. 8, insert 830 is welded to remote seal body 806 by a weld ring. The weld ring extends across side opening 840 on first side 842 such that insert 830 is suspended in expansion chamber 822 from opening 840 on first side 842. In another embodiment and as illustrated in FIG. 8, insert 830 is welded to remote seal body 806 via a cap 848. Cap 848 includes the same material as remote seal body 806 and is inserted into expansion chamber 822 between insert 830 and opening 840 on first side 842. Cap 848 is then welded to first side 842 of remote seal body 806 with a pair of weld rings 850.

Insert 830 has a coefficient of thermal expansion that is less than the coefficient of thermal expansion of remote seal body 806. Example materials for insert 830 include low thermal expansion non-outgassing materials, such as those materials discussed in regards to insert 730 of FIG. 7. Insert 830 is separated from opposing side surfaces 844 and 846 by a pair of gaps 852 and 854 and is separated from third surface 848 by a gap 856. Upon exposure of remote seal 802 to an extreme high temperature of process fluid 808, housing 806 and therefore expansion chamber 822 expands volumetrically more than insert 830 based on their respective material coefficients of thermal expansion. Such differences in volumetric expansion means that gaps 852, 854 and 856 between insert 830 and expansion chamber 822 will grow. The expanded fill fluid is allowed to fill gaps 852, 854 and 856 from passageway 820 instead of expanding under the isolation diaphragm 812.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while disclosed embodiments are described primarily with reference to process transmitters (industrial field devices) and remote seal systems having pressure sensors, expansion chambers including expansion inserts can be applied to other transmitter types.

What is claimed is:

1. A pressure transmitter measuring a pressure of a process fluid comprising:
    a pressure sensor;
    a pressure transmitter body having a first coefficient of thermal expansion and including a first opening;
    a first isolation diaphragm coupled to the pressure transmitter body and positioned in the first opening, the first isolation diaphragm having a first surface in communication with the process fluid;
    a first passageway extending between the first opening and the pressure sensor, the first passageway configured to contain fill fluid in communication with a second surface of the first isolation diaphragm;
    a first expansion chamber formed in the pressure transmitter body and coupled to the first passageway, the first expansion chamber including a first insert having a second coefficient of thermal expansion; and
    wherein the first coefficient of thermal expansion of the pressure transmitter body is greater than the second coefficient of thermal expansion of the insert.

2. The pressure transmitter of claim 1, wherein the first expansion chamber is interposed along the first passageway between the first opening and the pressure sensor.

3. The pressure transmitter of claim 1, wherein the first expansion chamber is defined by first surface, a second surface that couples the first surface and the first opening.

4. The pressure transmitter of claim 3, wherein the first insert is suspended in the first expansion chamber by attachment to the second surface to form a gap between the first surfaces and the first insert.

5. The pressure transmitter of claim 4, wherein the first insert includes a central passageway that extends through the first insert from the first opening to the third surface of the expansion chamber.

6. The pressure transmitter of claim 1, wherein the first expansion chamber is interposed between a first side opening on a first side of the body and the first passageway.

7. The pressure transmitter of claim 1, wherein the first expansion chamber is defined by first and second opposing surfaces, a third surface that couples the first and second opposing surfaces and a first side opening on the first side of the pressure transmitter body.

8. The pressure transmitter of claim 7, wherein the first insert is suspended in the first expansion chamber and the side opening is sealed to form the first expansion chamber.

9. The pressure transmitter of claim 7, wherein the first insert is suspended in the first expansion chamber by attachment to the pressure transmitter body at the first side opening to form gaps between the first and second opposing surfaces and the first insert and between the third surface and the first insert.

10. The pressure transmitter of claim 7, wherein the first expansion chamber is fluidically coupled to the first passageway at the third surface of the expansion chamber.

11. The pressure transmitter of claim 1, further comprising:
    a second isolation diaphragm positioned in a second opening in the pressure transmitter body, the second isolation diaphragm having a first surface in communication with the process fluid;
    a second passageway extending between the second opening and the pressure sensor, the second passageway configured to contain fill fluid in communication with a second surface of the second isolation diaphragm;
    a second expansion chamber formed in the pressure transmitter body and coupled to the second passageway, the second expansion chamber including a second insert having a third coefficient of thermal expansion; and
    wherein the first coefficient of thermal expansion of the pressure transmitter body is greater than the third coefficient of thermal expansion of the second insert.

12. A pressure monitoring system comprising:
    a pressure sensor;
    a body having a first coefficient of thermal expansion and including at least one opening for accessing a process fluid;
    at least one isolation diaphragm coupled to the body and positioned in the at least one opening, the at least one isolation diaphragm having a first surface in communication with the process fluid;
    at least one passageway located in the body and configured to contain a fill fluid in communication with a second surface of the first isolation diaphragm, the at least one passageway positioned between the first isolation diaphragm and the pressure sensor;
    at least one expansion chamber coupled to the first passageway and including an insert having a second coefficient of thermal expansion; and
    wherein the first coefficient of thermal expansion of the body is greater than the second coefficient of thermal expansion of the insert.

13. The pressure monitoring system of claim 12, wherein the body comprises a pressure transmitter.

14. The pressure monitoring system of claim 12, wherein the at least one passageway extends between the at least one isolation diaphragm and the pressure sensor in the pressure transmitter.

15. The pressure monitoring system of claim 12, wherein the body comprises a remote seal.

16. The pressure monitoring system of claim 15, wherein the at least one passageway extends between the at least one isolation diaphragm and a capillary tube that couples the body of the remote seal to the pressure sensor.

17. A remote seal system comprising:
   a pressure transmitter including a pressure sensor;
   a remote seal body having a first coefficient of thermal expansion and including an opening for accessing a process fluid;
   an isolation diaphragm coupled to the remote seal body and positioned in the opening, the isolation diaphragm having a first surface in communication with a process fluid;
   a passageway located in the remote seal body and configured to contain a fill fluid in communication with a second surface of the isolation diaphragm, the passageway positioned between the isolation diaphragm and a capillary tube connected to the pressure transmitter;
   an expansion chamber coupled to the passageway, the expansion chamber including an insert having a second coefficient of thermal expansion; and
   wherein the first coefficient of thermal expansion of the remote seal body is greater than the second coefficient of thermal expansion of the insert.

18. The remote seal system of claim 17, wherein the expansion chamber is interposed along the passageway between the opening and the capillary tube.

19. The pressure transmitter of claim 18, wherein the expansion chamber is defined by:
   first surface;
   a second surface that couples to the first surface and is configured for attachment to the insert; and
   the opening that opposes the second surface.

20. The pressure transmitter of claim 17, wherein the expansion chamber is positioned between a first side opening on a first side of the remote seal body and the passageway.

21. The pressure transmitter of claim 20, wherein the expansion chamber is defined by:
   first and second opposing surfaces;
   a third surface that couples the first and second opposing surfaces and is configured for fluidic communication with the passageway; and
   the first side opening on the first side of the body that opposes the third surface.

* * * * *